United States Patent
Plach et al.

[11] Patent Number: 6,166,798
[45] Date of Patent: *Dec. 26, 2000

[54] TN CELL HAVING IMPROVED DISPLAY OF GREY SHADES

[75] Inventors: Herbert Plach, Darmstadt, Germany; Paulus Adrianus Breddels, Seoul, Rep. of Korea

[73] Assignee: Merck KGaA, Darmstadt, Germany

[ * ] Notice: This patent is subject to a terminal disclaimer.

[21] Appl. No.: 09/055,887

[22] Filed: Apr. 7, 1998

Related U.S. Application Data

[63] Continuation of application No. 08/883,339, Jun. 26, 1997, abandoned, which is a continuation of application No. 08/763,514, Dec. 11, 1996, Pat. No. 5,696,570, which is a continuation of application No. 08/162,186, Dec. 16, 1993.

[30] Foreign Application Priority Data

Apr. 16, 1992 [DE] Germany .............................. 42 12 744

[51] Int. Cl.$^7$ .................................................. C09K 19/02
[52] U.S. Cl. ........................................... 349/181; 349/180
[58] Field of Search .................................... 349/181, 180, 349/186, 177

[56] References Cited

U.S. PATENT DOCUMENTS 5,696,570 12/1997 Plach et al. .............................. 349/181

*Primary Examiner*—William L. Sikes
*Assistant Examiner*—Dung Nguyen
*Attorney, Agent, or Firm*—Millen White Zelano & Branigan

[57] ABSTRACT

The invention relates to a TN cell which contains a nematic liquid crystal having positive dielectric anisotropy and a twist angle of essentially 90°, between two substrates provided with electrode and alignment layers, where the product of the separation between the substrate plates d and the optical anisotropy d·Δn [sic] of the liquid crystal is between 0.15 and 0.70 μm, characterised in that the liquid crystal contains a doping component in order to improve the grey shade capacity, so that the cell has a value for the undisturbed quotient of the separation between the substrate plates d and the pitch of the liquid crystal p of $0.1 \leq d/p \leq 0.5$.

41 Claims, 8 Drawing Sheets

TN CELL HAVING IMPROVED DISPLAY OF GREY SHADES

This is a continuation of application Ser. No. 08/883,339 filed Jun. 26, 1997, now abandoned, which is a continuation of Ser. No. 08/763,514 filed Dec. 11, 1996U.S. Pat. No. 5,696,570; which is a continuation of Ser. No. 08/162,186 filed Dec. 16, 1993 (patented).

TN cell having improved display of grey shades The invention relates3 to a TN cell which contains a nematic liquid crystal having positive dielectric anisotropy and a twist angle of essentially 90°, between 2 substrates provided with electrode and alignment layers, where the product of the separation of the substrate plates d and the optical anisotropy $\Delta n$ of the liquid crystal is between 0.15 and 0.70 $\mu m$.

BACKGROUND OF THE INVENTION

Cells of this type, which are described in DE 30 22 818, are characterised by a favourable viewing-angle dependence of the contrast and have become predominant very generally, in particular in high-information displays addressed by means of an active matrix.

However, it is disadvantageous in such cells that an effect known as inverse contrast is observed when grey shades are displayed; this means that the contrast, after increasing initially when a relatively high voltage is applied, first drops again. FIG. 1 shows electro-optical characteristic lines at various viewing angles θ for a TN cell which has a twist angle of 90° and a cell separation of d=5.94 $\mu m$, and contains the following liquid-crystal mixture LC I:

5.0% of 4-(trans-4-pentylcyclohexyl)-1-fluorobenzene
5.0% of 4-(trans-4-heptylcyclohexyl)-1-fluorobenzene
8.0% of 4-[trans-4-(trans-4-ethylcyclohexyl)cyclohexyl]-1-trifluoromethoxybenzene
9.0% of 4-[trans-4-(trans-4-propylcyclohexyl)cyclohexyl]-1-trifluoromethoxybenzene
9.0% of 4-[trans-4-(trans-4-pentylcyclohexyl)cyclohexyl]-1-trifluoromethoxybenzene
11.0% of 1-[trans-4-(trans-4-propylcyclohexyl)cyclohexyl]-2-(3,4-difluorophenyl) ethane
11.0% of 1-[trans-4-(trans-4-pentylcyclohexyl)cyclohexyl]-2-(3,4-difluorophenyl)ethane
5.0% of 2,6-difluoro-4-(trans-4-propylcyclohexyl)-3',4'-difluorobiphenyl
4.0% of 2,6-difluoro-4-(trans-4-pentylcyclohexyl)-3',4'-difluorobiphenyl
8.0% of 4-[trans-4-(trans-4-propylcyclohexyl)cyclohexyl]-2,6-difluoro-1-difluoromethoxybenzene
14.0% of 4-[trans-4-(trans-4-pentylcyclohexyl)cyclohexyl]-2,6-difluoro-1-difluoromethoxybenzene
6.0% of 4-trifluoromethoxyphenyl trans-4-(trans-4-propylcyclohexyl)cyclohexylcarboxylate
6.0% of 4-trifluoromethoxyphenyl trans-4-(trans-4-pentylcyclohexyl)cyclohexylcarboxylate The liquid-crystal mixture LC I has the following properties:

| | |
|---|---|
| Clearing point | N 103° C. I |
| Viscosity | $\eta$ (20° C.) = 21 $mm^2 s^{-1}$ |
| Dielectric anisotropy | $\Delta \epsilon$ (20° C., 1 kHz) = 6.9 |
| Optical anisotropy | $\Delta n$ (20° C., 589 nm) = 0.0848 |

The optical path length difference of the cell is $d \cdot \Delta n = 0.50$ $\mu m$; the cell contains on both sides a linear polariser whose absorption axes are rotated through 90° relative to one another, the front polariser and the preferential direction of the molecules forming an angle of 90° at the substrates. Analogous results are obtained if the polarisers are arranged parallel to the preferential direction of the molecules. In the case of polarisers rotated through 90° relative to one another, the cell becomes dark when addressed (known as positive contrast mode). Conversely, cells having polarisers arranged parallel to one another are dark in the unaddressed state and become bright when addressed (known as negative contrast mode).

The definition of the viewing angle θ is shown in FIG. 2. If the display is viewed obliquely from above, θ is <0, and correspondingly for observation obliquely from below, θ is >0. Characterisation of the viewing-angle dependence requires a second angle $\Phi$, which is in the plane perpendicular to θ=0° and varies from 0–360°; $\Phi$ is referred to below as the observation angle.

FIG. 1 shows-the relative contrast of the above cell as a function of the applied voltage for various viewing angles θ. A relative contrast of 100% is obtained if the transmission in the optical measuring device with the (halogen) lamp switched on and off is measured without a liquid-crystal cell. The position of the electro-optical characteristic line with respect to the voltage axis is described using voltage values $V_{x,y,z}$, where a contrast of x% is observed at a viewing angle θ of y° and a temperature of z° C. $V_{10,0,20}$ is frequently also known as the threshold voltage and $V_{90,0,20}$ as the saturation voltage.

It can be seen from FIG. 1 that the shape and position of the electro-optical characteristic line with respect to the voltage axis change as the viewing angle θ is varied. If the display is arranged, for example, so that the best contrast is obtained for observation obliquely from below, for example for θ≈10°, and then the viewing angle θ is varied at a fixed voltage, for example at $V_{90,0,20}$, a decrease in the relative contrast C is observed, i.e. the display becomes brighter, for θ<0, i.e. for observation obliquely from above. For θ>0, i.e. for observation obliquely from below, an increase in the contrast C is first obtained, i.e. the grey tone defined by $V_{90,0,20}$ becomes darker. If the viewing angle is increased further, the grey tone becomes brighter again and the contrast C drops below the contrast observed in the case of small viewing angles θ. This phenomenon, known as inverse contrast, proves to be very disturbing during observation of a display. When a black/white display is observed obliquely from below (θ>0°), an increasing viewing angle (typically from about θ≈30°) causes areas in the display which are dark grey for a relatively small positive θ to become black, whereas areas which are black for a relatively small positive θ appear dark grey at a large positive θ. In the case of colour displays, the effect causes some colours to be exchanged. A graphic measure of the strength of the inverse contrast is the extent of the fall in the electro-optical characteristic line at large positive viewing angles θ (for example θ=45°) after having reached the maximum contrast for the first time (in FIG. 1 approximately the region of the electro-optical characteristic line between 1.8 and 2.7 V for θ=45°).

In order to display grey shades, the cell is addressed in the region of the rising characteristic line, and the relative contrast values C, observed, for example, at $V_{50,0,20}$, $V_{60,0,20}$, $V_{90,0,20}$, etc., correspond to different grey shades. In order to elucidate the phenomenon of inverse contrast, FIG. 3 shows this from the contrast values C measured at 2 different voltages $V_{90,10,20}\pm 100$ mV, in an isocontrast diagram as a function of the viewing angle θ and the observation angle Φ. If the quotient a=C $(V_{90,10,RT}+100$ mV)/C $(V_{90,10,RT}-100$ mV) is >1, an increase in contrast is observed when the voltage is increased, and grey tones become correspondingly darker (normal contrast). If, by contrast, this quotient is less than 1, the contrast drops with increasing voltage and the grey tones become brighter (inverse contrast). In FIG. 3, the areas where 0.9<a≦1 are marked in pale grey, those where 0.8<a≦0.9 are marked in dark grey and those where a≦0.8 are marked in black. It can be seen that a large region with inverse contrast arises for a conventional TN cell if the cell is observed obliquely from below.

SUMMARY OF THE INVENTION

Figure 1:
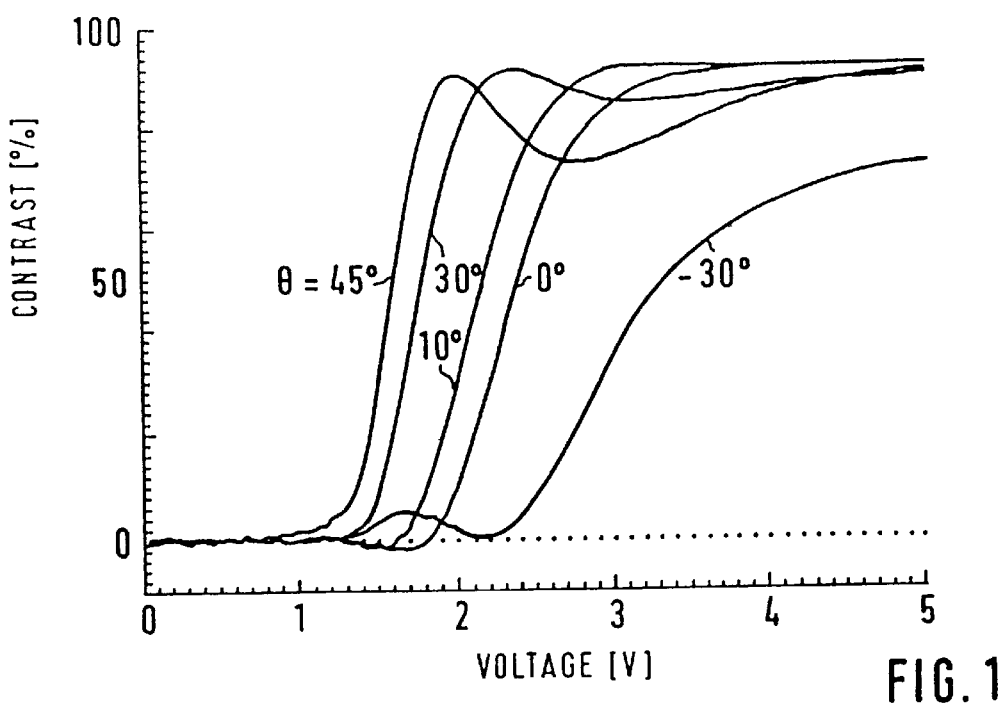
FIGS. 1–3, 8 and 10a depict prior art definitions which illustrate the problems solved by this invention, as described above and below. The remaining Figures contain graphical illustrations of properties of cells of the invention as discussed more fully below.

The invention had the object of providing TN cells in which the phenomenon of inverse contrast is less pronounced than in conventional cells. Further objects of the present invention are apparent to a person skilled in the art without further explanation from the detailed description below.

It has been found that these objects can be achieved by the provision of the TN cells according to the invention.

The invention thus relates to a TN cell which contains a nematic liquid crystal having positive dielectric anisotropy and a twist angle of essentially 90°, between two substrates provided with electrode and alignment layers, where the product of the separation between the substrate plates d and the optical anisotropy of the liquid crystal is between 0.15 and 0.70 μm, characterised in that the liquid crystal contains a doping component in order to improve the grey shade capacity, so that the cell has a value for the quotient of the separation between the substrate plates d and the undisturbed pitch of the liquid crystal p of 0.1≦d/p≦0.5.

The structure of the TN cells according to the invention corresponds to that of conventional TN cells. The liquid-crystal layer is located between 2 substrates or outer plates which form a cell together with a frame.

Electrode layers, which comprise, for example, thin, planar and transparent indium/tin oxide (ITO) or indium oxide (In$_2$O$_3$) layers, are located on the insides of the substrates. If the system is capable of colour reproduction, at least one of the two substrates has a further layer containing the organic colour materials, or the cell is illuminated with coloured light.

Alignment layers which are in direct contact with the liquid crystal and cause an essentially planar edge alignment of the liquid-crystal molecules are located on the insides of the cell. The liquid-crystal molecules here have a certain pretilt a, which is generally 0°≦α≦10° (low-tilt alignment). In order to produce a planar alignment layer of relatively low pretilt, polymer layers, for example polyimide or polyvinyl alcohol layers, are usually used and are given a preferential alignment by rubbing, optionally with simultaneous application of pressure.

Further layers, such as, for example, compensation and insulation layers, may be arranged between the electrode and alignment layers.

The preferential directions, caused by the alignment layers, of the nematic directors in the plane of the front and rear substrate plates are generally rotated essentially through 90° relative to one another, which causes a twisted structure of the liquid-crystal layer. The term essentially 90° should be understood here in broad terms and includes TN cells having a twist angle β=90°±30 and in particular β=90°±15.

A doping component comprising one or more optically active dopes is frequently added to the liquid-crystal mixture in order to prevent the formation of reverse-twist regions, as described in E. P. Raynes, Electron. Lett., 10 (1974) 141. However, the concentration and the HTP of the doping component, which is defined for a dope as $$HTP = \frac{1}{p \cdot c}$$

where p is the undisturbed pitch in μm and c is the concentration of the dope in %, are selected so that the quotient of the cell thickness and the pitch of the liquid-crystal mixture used is small; typically, d/p is chosen to be <0.1, in particular <0.05.

In extensive experimental investigations, it has now been found that TN cells having low viewing-angle dependence of the contrast and improved display of grey tones are obtained if the liquid-crystal mixture is selected so that 0.15 μm≦d·Δn≦0.70 μm, and if a doping component, comprising one or more dopes, and having such a concentration and HTP that the TN cell has an undisturbed d/p value of 0.1≦d/p≦0.5 is added to the liquid-crystal mixture.

The d/p values given above and below are undisturbed d/p values, as arise, for example, in a wedge cell without surface alignment.

In an a TN cell having a twist angle of, for example, 90°, for undisturbed doping where 0≦d/p≦0.5, preferential directions, rotated through 900 relative to one another by the alignment layers, of the nematic directors are forced in the plane of the front and rear substrate plates, so that the actual or disturbed d/p value of the TN cell is always d/p=0.25. If the level of doping is selected to be so high that the undisturbed d/p value is greater than 0.5, a twist angle of 27020 would be formed in the TN cell with these boundary conditions, i.e. an STN cell having a disturbed d/p value of 0.75 would result.

By contrast, the d/p values given above and below are undisturbed or calculated d/p values which are obtained in the case of nonobservance of the boundary conditions.

Figure 4:
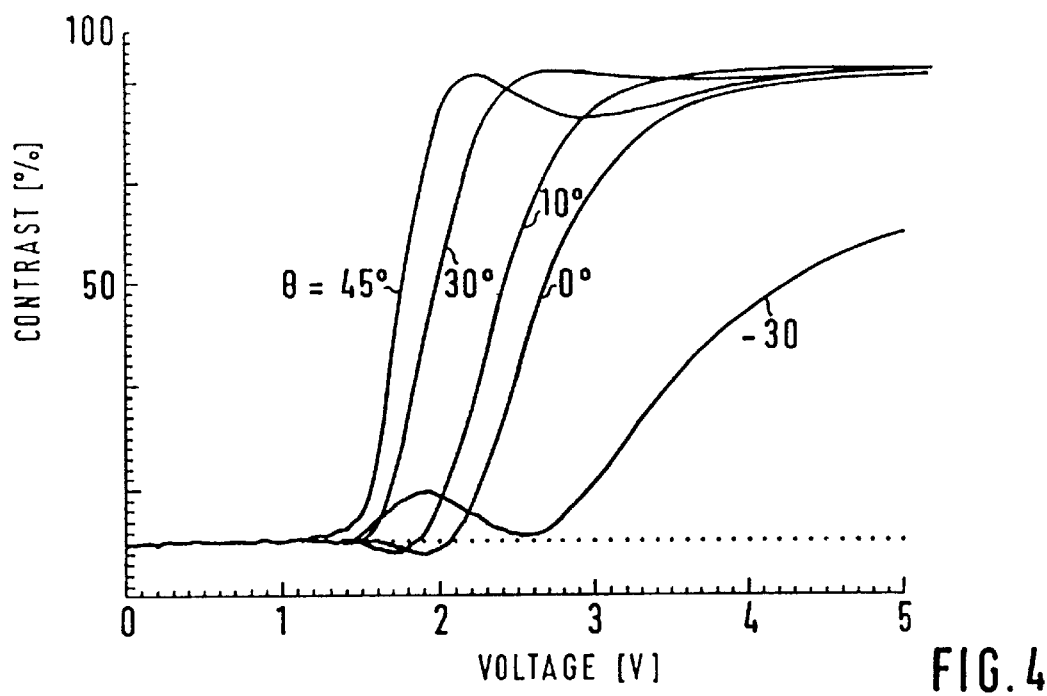
Figure 5:
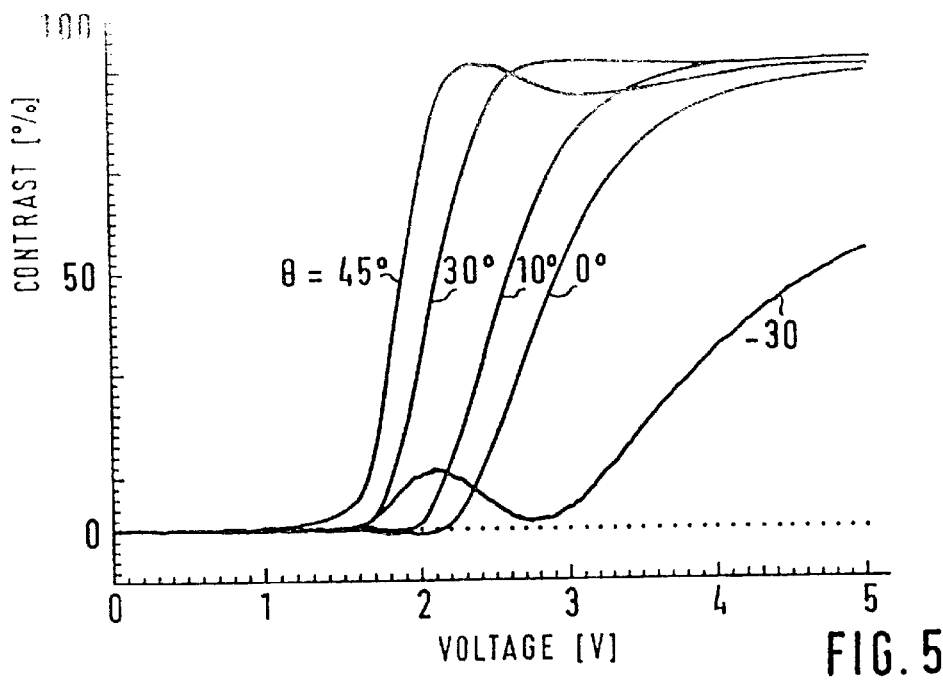

FIGS. 4 and 5 show electro-optical characteristic lines for a TN cell which substantially corresponds to the TN cell described in FIG. 1, with the difference that the liquid-crystal mixture present in the TN cell from FIG. 1 is undoped (d/p=0), whereas the dopant S-811 (commercial product from E. Merck, Darmstadt)

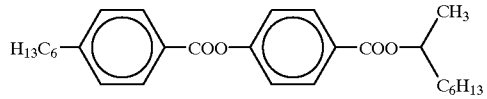

has been added to the liquid-crystal mixture in the TN cells from FIGS. 4 and 5 in the following concentrations:

| TN cell from | C(S-811) [%] | d/p [1] |
|---|---|---|
| FIG. 4 | 0.28 | 0.20 |
| FIG. 5 | 0.58 | 0.40 |

The abovementioned liquid-crystal mixture LC I is used in each of the TN cells from FIGS. 1, 4 and 5.

A comparison of FIG. 1 with FIGS. 4 and 5 shows that the effect of inverse contrast is significantly reduced with increasing d/p. It can be seen that the depth of the minimum in the electro-optical characteristic line after the first contrast maximum has been passed, which is a vivid measure of the strength of the inverse contrast, is significantly less pronounced in the TN cells according to the invention, at d/p=0.2 and in particular at d/p=0.4, than in the conventional TN cell, where d/p≈0.

Figure 3:
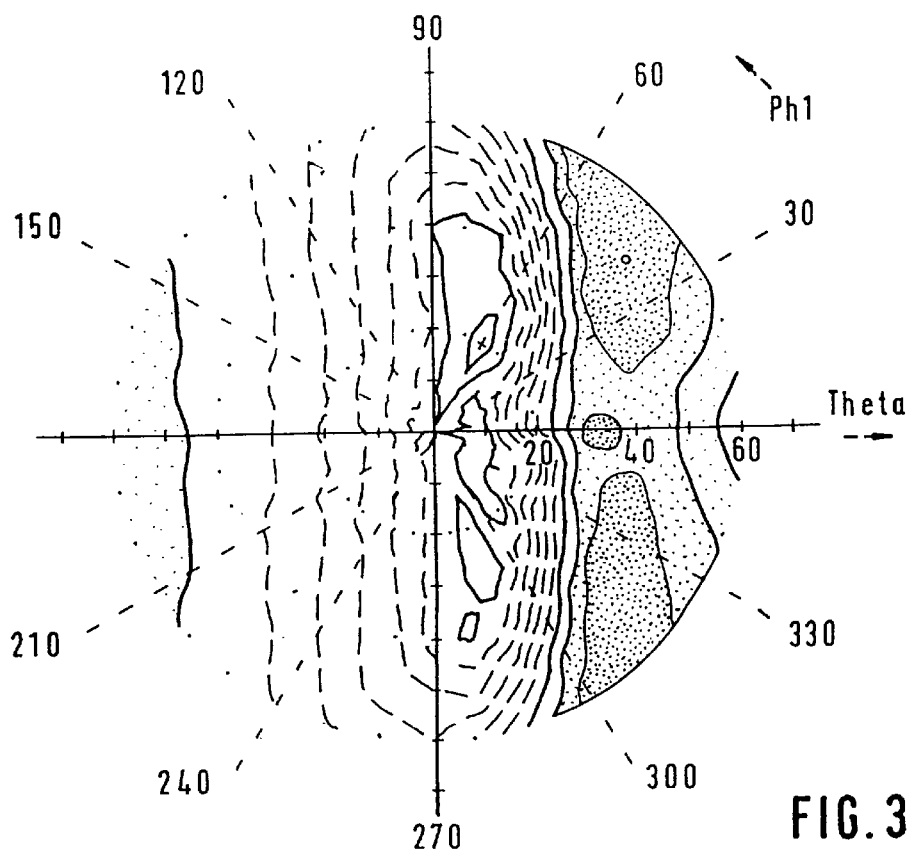
Figure 2:
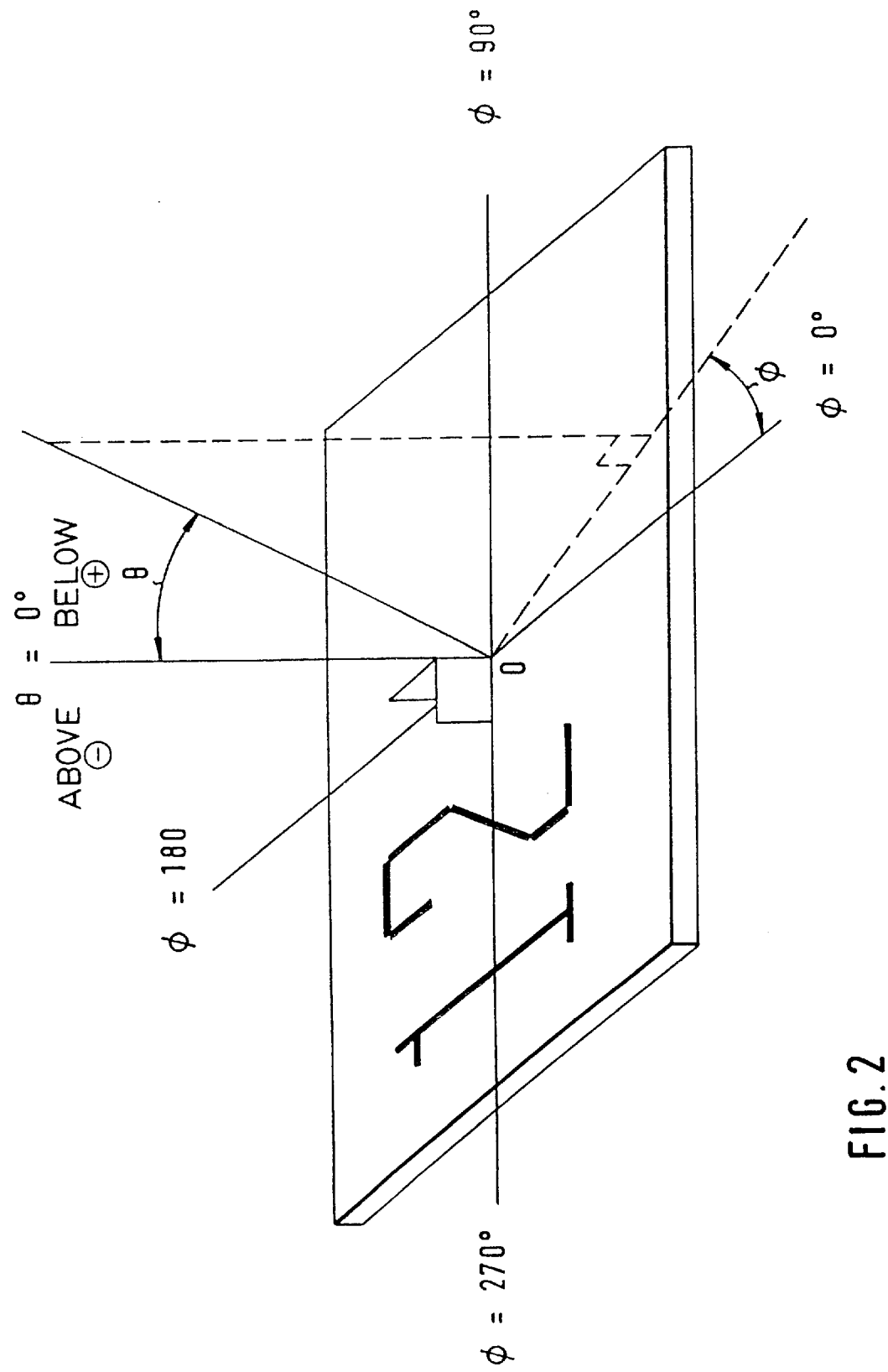
Figure 6:
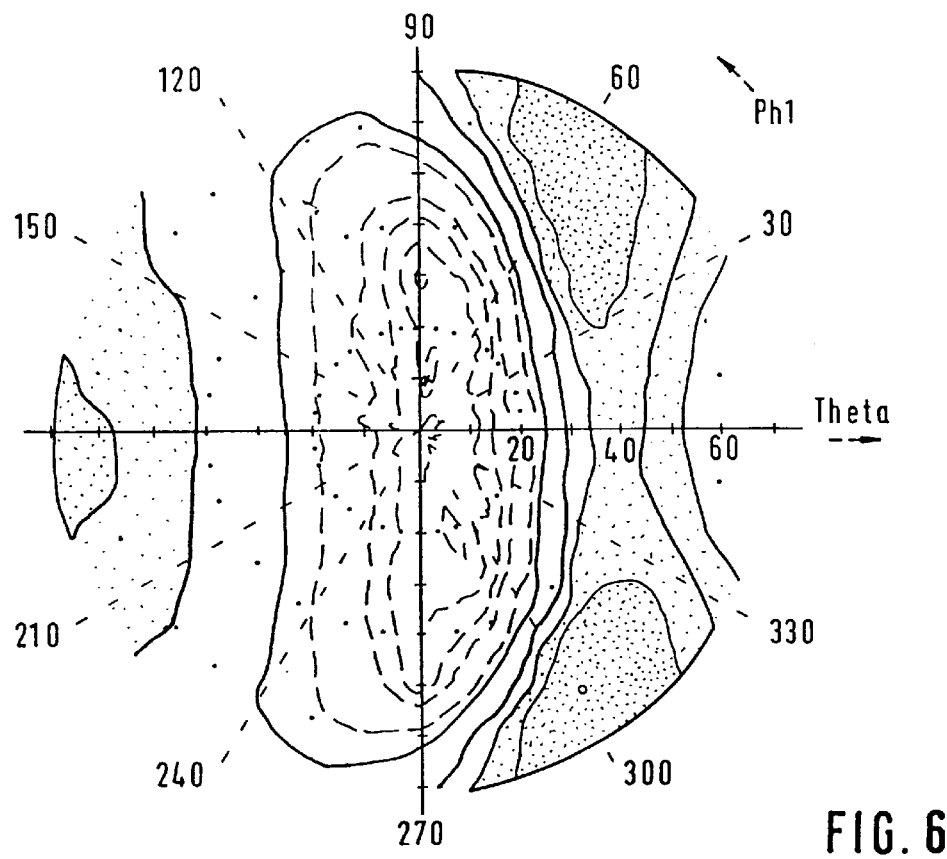
Figure 7A:
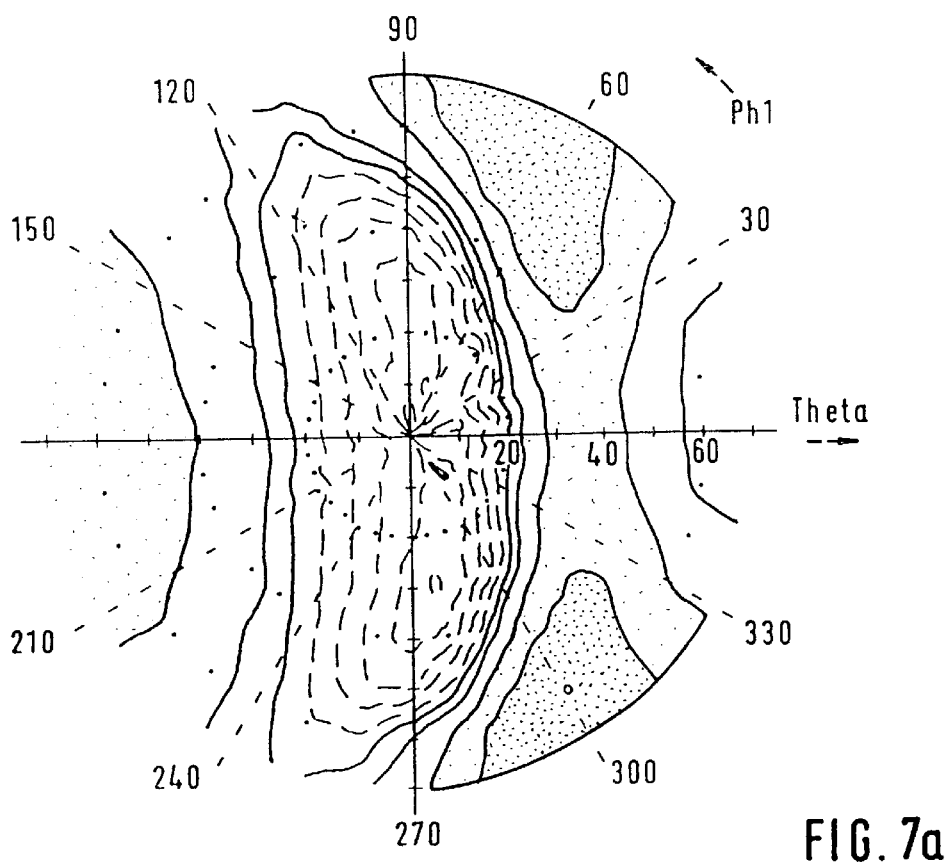

FIGS. 6 and 7a show the isocontrast diagrams corresponding to FIG. 3 for the TN cells described in FIG. 4 and 5; the quotient a of the contrast values at $V_{90,10,20}$±100 mV (FIG. 6, d/p=0.20) or $V_{90,10,20}$±100 mV (FIG. 7a, d/p=0.40) is plotted in each case. It can be seen that the regions in which inversion of the contrast is observed when the voltage is changed (0.9<a≦1 marked in pale grey, 0.8<a≦0.9 marked in dark grey and a≦0.8 marked in black) become significantly smaller.

Figure 7B:
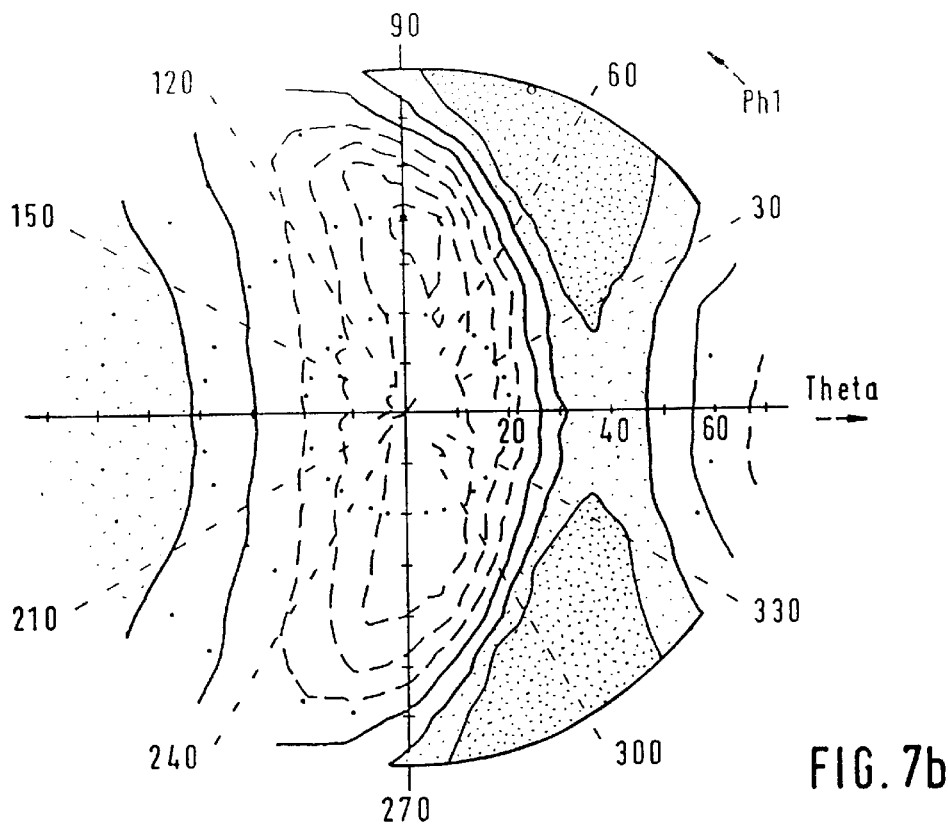

FIG. 7b shows an isocontrast diagram for the TN cell described in FIG. 5 (LC I, d/p=0.40), where the quotient a of the contrast values at $V_{90,10,20}$±117 mV is plotted. The same relative (visual) change in contrast is achieved by the change in voltage from 117 mV above to 117 mV below $V_{90,10,20}$ for the doped system from FIG. 5 as for a change in voltage from 100 mV above to 100 mV below $V_{90,10,20}$ for the undoped system from FIG. 1

$$\left(\left[\frac{V_{90}}{V_{10}}(d/p=0)\bigg/\frac{V_{90}}{V_{10}}(d/p=0.4)\right]\times 100 \text{ mV} = 117 \text{ mV}\right);$$

the greater change in voltage is necessary in the doped system due to the lower gradient of the electro-optical characteristic line in the upper region of its rise.

A comparison of FIG. 3 and FIG. 7b shows that the TN cells according to the invention have significantly smaller angle regions with inverse contrast than conventional TN cells even if the cells are operated under conditions which give the same visual contrast.

Figure 10A:
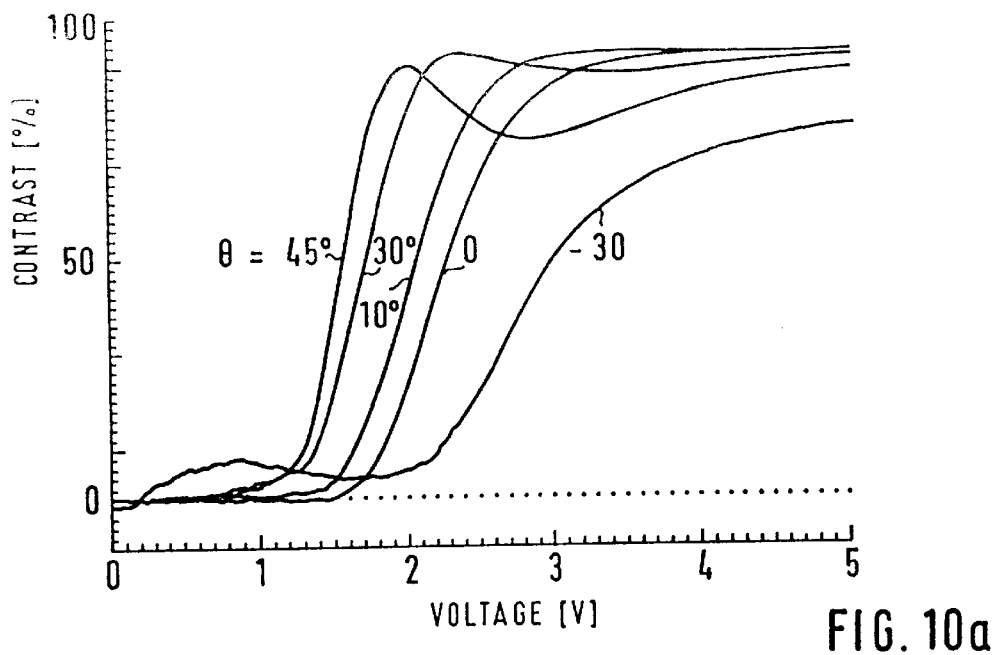
Figure 10B:
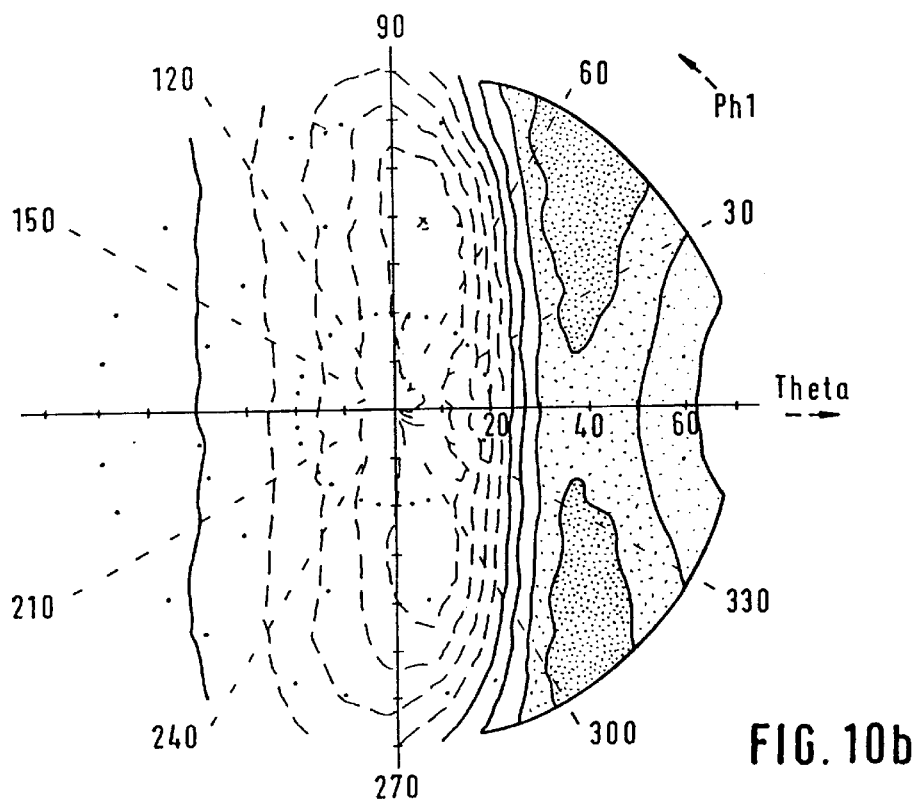

FIG. 10a shows electro-optical characteristic lines for various viewing angles θ for a conventional, undoped TN cell (d/p=0) having a twist angle of 90° and a cell gap of d=4.72 μm and containing the liquid-crystal mixture LC I, so that d·Δn=0.4 μm. FIG. 10b shows an isocontrast diagram for this cell in which the quotient a of the contrast values at $V_{90,10,20}$±100 mV is plotted.

Figure 11A:
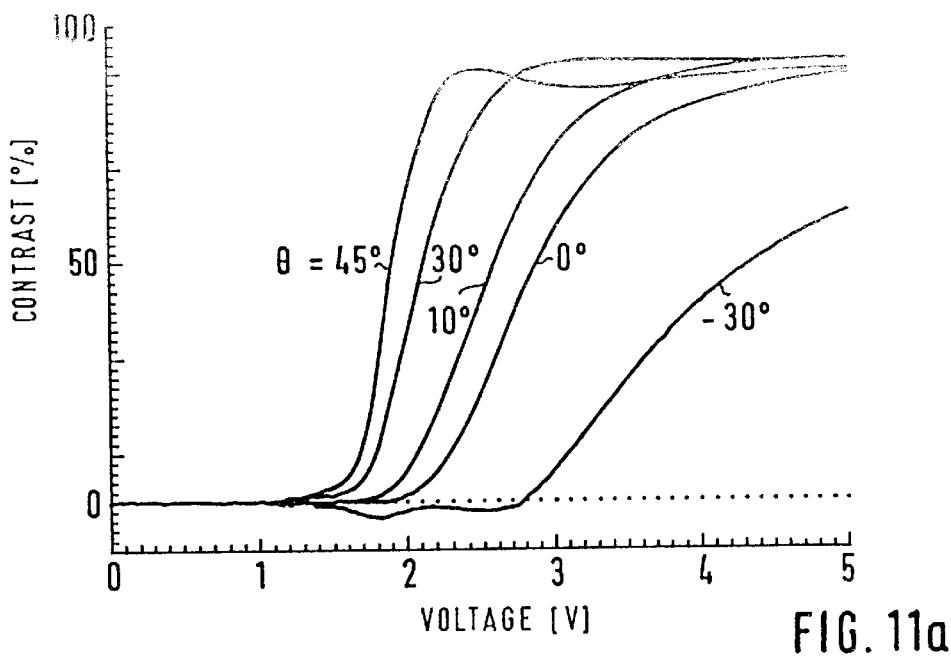
Figure 11B:
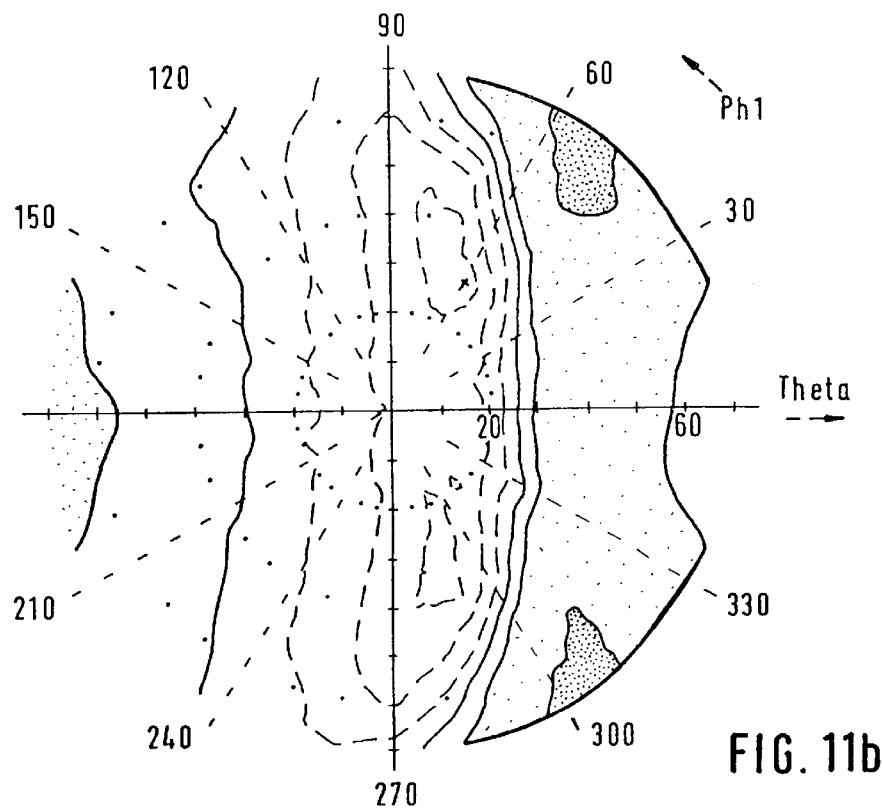

FIG. 11a shows electro-optical characteristic lines for various viewing angles θ for a TN cell according to the invention where d/p=0.49 (twist angle 90°; d =4.72 μm; liquid-crystal mixture LC I to which 0.86% of the dopant (S)-811 has been added), and FIG. 11b shows an isocontrast diagram for this cell in which the quotient a of the contrast values at $V_{90,10,20}$±100 mV is plotted.

A comparison of FIGS. 10a and 11a or 10b and 11b shows the significant reduction in the inverse contrast and the increase in the grey tone capacity in the case of the TN cell according to the invention.

However, the undisturbed d/p value cannot be selected infinitely high in the cells according to the invention. If the preferential directions of the nematic director which are caused by the alignment layers are essentially perpendicular to one another at the two substrates, the undisturbed d/p value must not be selected at greater than 0.5, since otherwise a twist angle of ; β=270° would be produced.

On the other hand, the undisturbed d/p value should not be selected to be less than 0.10, in particular not less than 0.15 and very particularly not less than 0.20, so as to obtain a sufficient reduction in the inverse contrast.

The choice of the d/p working point in the range 0.10≦d/p≦0.50 or in the preferred intervals 0.15 or 0.20≦d/p≦0.50 is also affected by the two effects below:

(1) A comparison of FIGS. 1, 4 and 5 shows that the electro-optical characteristic lines are shifted to higher voltages. This becomes particularly clear from the following Table, which shows the voltages $V_{10,10,20}$, $V_{50,10,20}$ and $V_{90,0,20}$ for TN cells which correspond to the TN cell described in FIG. 1, but in which the d/p value has been varied between 0 and 0.5.

TABLE

| d/p | $V_{10,10,20}$ [V] | $V_{50,10,20}$ [V] | $V_{90,10,20}$ [V] |
|---|---|---|---|
| 0 | 1.88 | 2.28 | 2.82 |
| 0.10 | 1.94 | 2.39 | 3.09 |
| 0.20 | 2.05 | 2.53 | 3.31 |
| 0.30 | 2.15 | 2.65 | 3.56 |
| 0.40 | 2.25 | 2.77 | 3.77 |
| 0.50 | 2.32 | 2.87 | 4.00 |

With increasing d/p value, all characteristic voltages, i.e., for example, also the threshold voltage $V_{10,10,20}$, become greater, which is disadvantageous since relatively high threshold voltages generally require more complex and more expensive drivers. The d/p value which is still tolerable in the particular case is thus determined essentially by the specifications of the driver electronics to be used.

Figure 8:
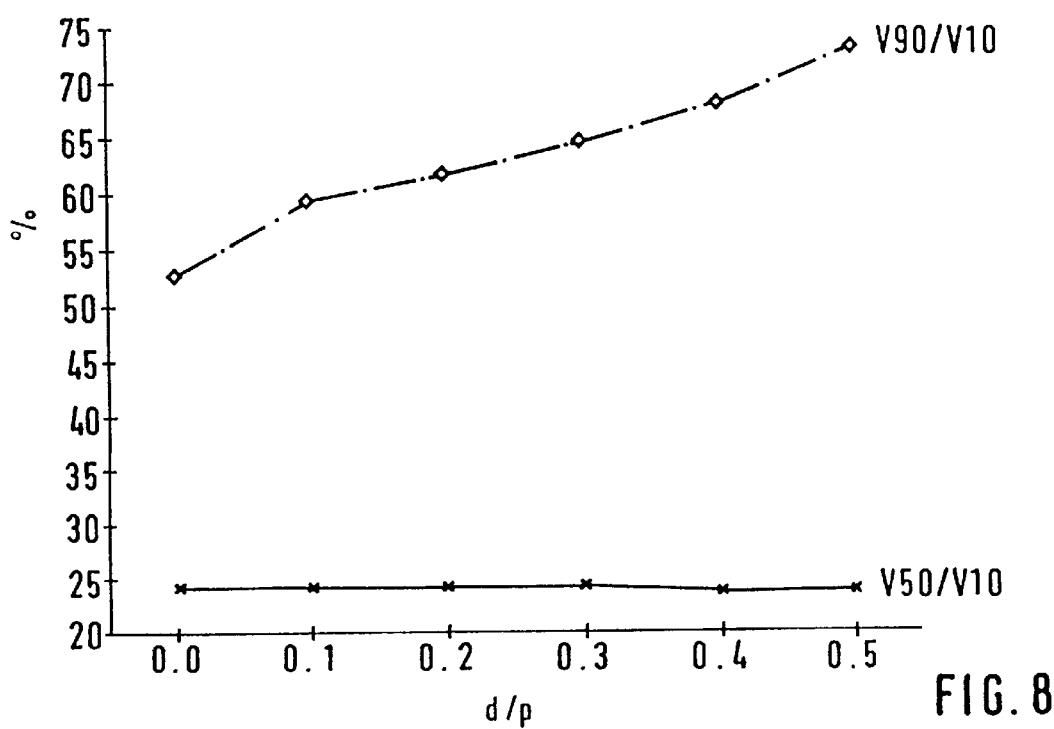

(2) In FIG. 8, the relative gradient $$V_{90/10} = \frac{V_{90,10,T} - V_{10,10,T}}{V_{90,10,T}} \text{ or } V_{50/10} = \frac{V_{50,10,T} - V_{10,10,T}}{V_{50,10,T}}$$

at various temperatures T as parameter is plotted as a function of the d/p value for TN cells which correspond to the cell described in FIG. 1 apart from the d/p value. Whereas $V_{50/10}$ remains virtually constant, $V_{90/10}$ increases with increasing d/p value. The increase in $V_{90/10}$ means that the characteristic line becomes flatter in the upper region of its rise, i.e. before reaching the first contrast maximum, which is very desirable since this allows the display of more grey tones in the important dark-grey region (for positive contrast mode TN cells, cross polarisation).

A person skilled in the art will in each case select the d/p value from the d/p ranges listed so that the suppression of the effect of inverse contrast and the reduction in the gradient in the upper region of the characteristic line are as great as possible, but without the increase in the threshold and saturation voltages making it impossible to use the proposed driver electronics. This optimisation can in each case be carried out by a person skilled in the art in a few experiments without the need for an inventive step. Very particular preference is given to the range $0.25 \leq d/p \leq 0.5$, in particular $0.35 < d/p \leq 0.5$.

TN cells which have
a d/p value of not less than 0.1 and
an optical path difference of $0.15 \, \mu m \leq d \cdot \Delta n \leq 0.70 \, \mu m$
are not described in the literature.

JP 195,221/1982 proposes TN cells whose liquid-crystal mixture has been doped with an optically active compound, so that $0.15 < d/p < 0.35$, in particular d/p–0.25. The optical path difference of the liquid-crystal layer is not stated, and $d \cdot \Delta n = 1.3 \, \mu m$ in the only example. The optically active compound is added in order to suppress dealignments in the liquid-crystal layer, which may be caused by imperfect alignment layers. The improvement in the electro-optical properties of a TN cell, in particular the combination of low viewing-angle dependence of the contrast, increased grey tone capacity in the dark-grey region with substantial suppression of the effect of inverse contrast, is not discussed. In addition, the novel teaching of JP 195,221/1982 is limited to TN cells whose liquid-crystal mixture contains a high proportion of liquid-crystal compounds of the

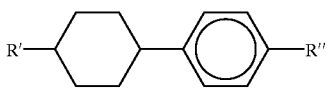

type, in which R' and R" are CN, alkyl, alkoxy, alkanoyloxy or alkoxycarbonyloxy; in the Example, the proportion of compounds of this type in the liquid-crystal mixture is about ⅔ (liquid-crystal mixture ZLI-1565, commercial product from E. Merck, Darmstadt).

U.S. Pat. No. 4,143,947 describes a process for improving the response times of twisted cells in which the liquid-crystal mixture has been doped and has a d/p value of $0.25 < d/p < 1$ in order to reduce the response times. This condition covers both TN and STN cells, the latter being characterized by completely different electro-optical properties (steep gradient of the electro-optical characteristic line and therefore low grey tone capacity, poorer viewing angle dependence of the contrast, inter-ference colours, etc.). The optical anisotropy is not discussed in greater detail, and $d \cdot \Delta n = 2.81 \, \mu m$ in an example ($d = 12.5 \, \mu m$, birefringence of the mixture $d \cdot \Delta n$ 0.225, E7 is a commercial product from Merck Ltd., GB).

In order to be able to achieve as substantially as possible the advantages which can be achieved on application of the technical teaching of the present invention, namely
increase in the grey tone capacity and
suppression of inverse contrast, without
simultaneously having to accept an intolerably high threshold voltage,
a person skilled in the art will preferably select the liquid-crystal mixture so that it has a low threshold voltage before addition of the doping component.

Figure 9:
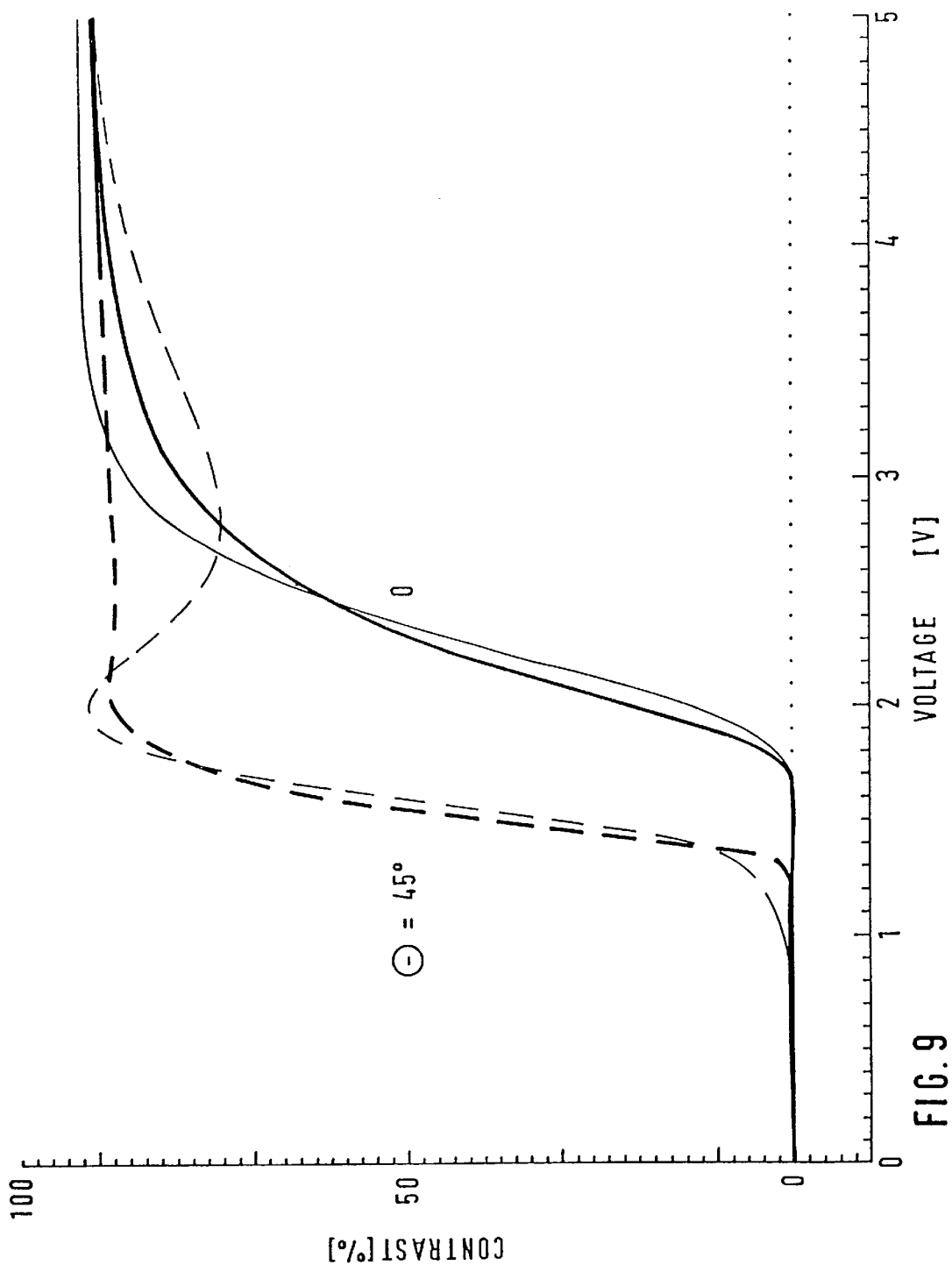

As an example, FIG. 9 compares the electro-optical characteristic lines for $\theta=0°$ at 45° for the TN cell described in FIG. 1 (thin dashed line) and for a corresponding TN cell (thick dashed line), but in which, in contrast to the liquid-crystal mixture LC I used in the TN cell of FIG. 1, the mixture LC II is used, which contains the following compounds:

4.0% of 4-(trans-4-pentylcyclohexyl)-1-benzene
9.0% of 4-[trans-4-(trans-4-ethylcyclohexyl)cyclohexyl]-1-trifluoromethoxybenzene
9.0% of 4-[trans-4-(trans-4-propylcyclohexyl)cyclohexyl]-1-trifluoromethoxybenzene
9.0% of 4-[trans-4-(trans-4-pentylcyclohexyl) cyclohexyl]-1-trifluoromethoxybenzene
7.0% of 2,6-difluoro-4-(trans-4-ethylcyclohexyl)- 3',4'-difluorobiphenyl
7.0% of 2,6-difluoro-4-(trans-4-propylcyclohexyl)-3',4'-difluorobiphenyl
8.0% of 2,6-difluoro-4-(trans-4-pentylcyclohexyl)-3',4'-difluorobiphenyl
16.0% of 4-[trans-4-(trans-4-ethylcyclohexyl)cyclohexyl]-1-difluoromethoxybenzene
14.0% of 4-[trans-4-(trans-4-propylcyclohexyl)cyclohexyl]-1-difluoromethoxybenzene
17.0% of 4-[trans-4-(trans-4-pentylcyclohexyl)cyclohexyl]-1-difluoromethoxybenzene LC II is doped by addition of S-811 so that d/p=0.49 (concentration of S-811: 0.63%).

The undoped liquid-crystal mixture LC II has the following properties:
Clearing point N 85° C. I
Dielectric anisotropy $\Delta\epsilon$ (1 kHz, 20° C.)=9.4
Optical anisotropy $\Delta n$ (589 nm, 20° C.)–0.0911

It can be seen that, for a very high doping level close to the upper limit of the permissible d/p range, the minimum in the electro-optical characteristic line of the doped TN cell at $\theta=45°$ has virtually disappeared. The gradient of the electro-optical characteristic line of the doped TN cell (d/p =0.49) is relatively small in the upper region, giving a high grey tone capacity in this region. The TN cells characterised in FIG. 9 have approximately the same threshold voltage at both viewing angles $\theta=0$ and $\theta=45°$, which is achieved through the fact that the undoped starting liquid-crystal mixture LC II of the doped TN cell has a significantly lower threshold voltage than the liquid-crystal mixture LC I of the undoped TN cell.

In numerous experimental investigations, it has been found that novel TN cells of this type whose liquid-crystal mixture contains one or more compounds of the formula I

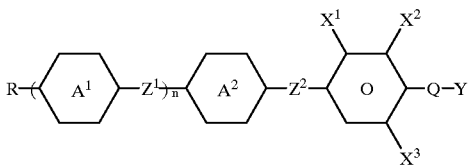

in which
R is an alkyl group in which, in addition, one or 2 non-adjacent CH$_2$ groups may be replaced by —O—, —CO—, —COO—, —OCO— or —CH=CH—,

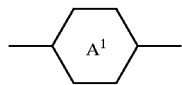

and

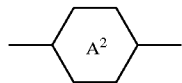

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, and one of

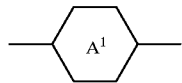

and

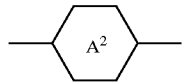

is alternatively pyrimidine-2,5-diyl, pyridine-2,5-diyl or trans-1,4-dioxane-2,5-diyl,
Z$^1$ and Z$^2$, independently of one another, are also a single bond, —CH$_2$CH$_2$—, —COO—, —OCO— or —C≡C—,
X$^1$, $^2$ and X$^3$, independently of one another, are H or F,
Q is CF$_2$, OCF$_2$, C$_2$F$_4$, OC$_2$F$_4$ or a single bond,
Y is E, F or Cl, and
n is 0, 1 or 2,
are very particularly preferred.

TN cells according to the invention whose liquid-crystal mixture contains not less than 50% and in particular more than 75% of one or more compounds of the formula I have, in addition to the other advantages of the TN cells according to the invention, a high HR and are therefore particularly suitable for active matrix addressing.

The liquid-crystal compounds of the formula I, which are also known as SFM compounds (superfluorinated materials), are known, and they are prepared by methods known per se, as revealed to a person skilled in the art by, for example, Houben-Weyl, Methoden der organischen Chemie [Methods of Organic Chemistry], Stuttgart.

The doping component may contain one or more chiral compounds, it being possible to add dopes and/or for the compounds of the liquid-crystal mixture also to be chiral.

If more than one, for example 2, chiral compounds are used, the reciprocal of the pitch p resulting overall is frequently given by a linear combination of the contributions of the individual compounds, for example $$\frac{1}{p} = HTP_1 c_1 + HTP_2 c_2,$$

where the index characterises the two different com- pounds.
Chiral compounds which have an HTP value of

|HTP (20° C.)|≧10 $\mu$m$^{-1}$ in the liquid-crystal mixture ZLI-1132 (commercial product from E. Merck, Germany) used as test mixture are preferred.
The doping component preferably contains not more than 10, in particular not more than 5, very particularly 1–3, chiral compounds.

The doping component is preferably selected so that the TN cell according to the invention has substantially temperature-independent electro-optical parameters and in particular a substantially temperature-independent threshold voltage. To this end, a doping component comprising 2 suitable dopes has been proposed for example, in DE 28 27 471, while the dopant(s) described in DE 33 33 677 and DE 35 23 185 give TN cells having a low temperature dependence of the electro-optical parameters even when only a single dopant(s) is used.
Chiral dopes of the formula II

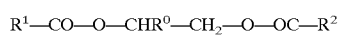

in which
R$^1$ and R$^2$, independently of one another, are each a —(A$^3$—Z$^3$)$_m$—(A$^4$)$_o$—V group,
in which
A$^3$ and A$^4$ are each, independently of one another, a 1,4-phenylene, pyrimidine-2,5-diyl, 1,4-cyclohexylene, 1,3-dioxane-2,5-diyl, 1,4-dithiane-2,5-diyl or 1,4-bicyclo-(2,2,2)octylene group, where these may also be monosubstituted or poly-substituted and by F, Cl, Br, CN and/or alkyl groups having up to 12 carbon atoms, where 1 or 2 nonadjacent CH$_2$ groups in the alkyl groups may be replaced by 0 atoms,
Z$^3$ is —CO—O—, —O—CO—, —CH$_2$CH$_2$—, —OCH$_2$—, —CH$_2$O—, —CH=N—, —N=CH—, —N—N—, —N(O)=N— or a single bond,
m and o are each, independently of one another, 0, 1 or 2, and
V is a straight-chain or branched alkyl group having up to 12 carbon atoms, where 1 or 2 non-adjacent CH$_2$ groups may be replaced by O atoms, or, if o is 1 or 2, is alternatively F, Cl, Br or CN,
and
R$^0$ is an alkyl group having 1–5 carbon atoms, unsubstituted or substituted (C$_6$–C$_{18}$)-aryl or (C$_5$–C$_{12}$)-cycloalkyl,
are preferred. Particularly preferred compounds of the formula II and processes for their preparation are described in DE 35 23 185.

The chiral dopant(s) may have one or more centres of chirality. Preference is given to doping components in which at least one chiral dopant(s) has 2 centres of chirality. Very particular preference is given to chiral components which contain the structural element II

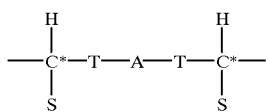

in which each S, independently of the other, is an alkyl or alkoxy group having 1–5 carbon atoms, CN or halogen, each T, independently of the other, is —O—, —COO—, —OOC—, —CH$_2$CH$_2$— or a single bond, and

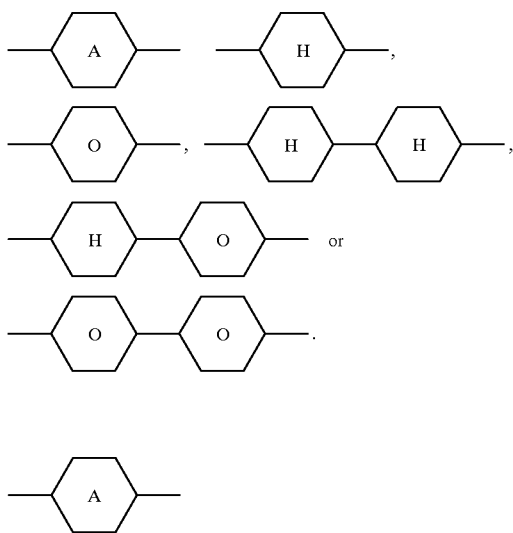

is preferably

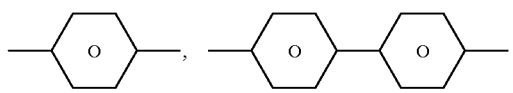

or

but in particular

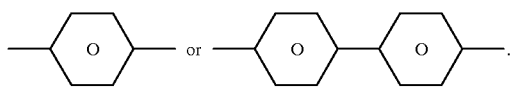

S is preferably CH$_3$—, CH$_3$—CH$_2$, Cl or CN, and very particularly preferably CH$_3$—, Cl or CN.

The TN cells according to the invention are distinguished by improved electro-optical properties and in particular by high viewing-angle independence of the contrast, by reduced inverse contrast and by an improved grey shade capacity. The TN cells according to the invention can be used in optical equipment and/or electronic equipment containing optical components. The TN cells according to the invention can be employed, in particular, as displays in TV sets, video equipment or further entertainment electronic equipment, as computer screens, and furthermore for multimedia reproduction or in traffic guidance systems and furthermore for a very wide variety of display applications. The TN cells according to the invention can be employed, in particular, for applications which require precise grey shade display; an example which may be mentioned is the use in optical computers.

What is claimed is:

1. A TN cell which contains a nematic liquid crystal composition having positive dielectric anisotropy and a twist angle of essentially 90° C., between two substrates provided with electrode and alignment layers, where the product of the separation between the substrate plates d and the optical anisotropy an of the liquid crystal is between 0.15 and 0.70 μm, and where the liquid crystal contains a doping component in order to improve the grey shade capacity, so that the cell has a value for the undisturbed quotient of the separation between the substrate plated d and the pitch of the liquid crystal p of $0.1 \leq d/p \leq 0.25$.

2. A TN cell according to claim 1, wherein the doping component is selected so that the temperature dependence of the threshold voltage is low.

3. Video equipment comprising a TN cell of claim 1.

4. A television set comprising a TN cell of claim 1.

5. A computer screen comprising a TN cell of claim 1.

6. A traffic guidance system comprising a TN cell of claim 1.

7. An optical computer comprising a TN cell of claim 1.

8. Optical equipment comprising a TN cell of claim 1.

9. Electronic equipment containing optical components comprising a TN cell of claim 1.

10. A method which comprises displaying information on a TN cell of claim 1.

11. A TN cell according to claim 1 which displays gray shades, whereby the gray shade capacity of the cell is improved by addition of the doping component.

12. A TN cell which contains a nematic liquid crystal composition having positive dielectric anisotropy and a twist angle of essentially 90° C., between two substrates provided with electrode and alignment layers, where the product of the separation between the substrate plates d and the optical anisotropy an of the liquid crystal is between 0.15 and 0.70 μm, and where the liquid crystal contains a doping component in order to improve the grey shade capacity, so that the cell has a value for the undisturbed quotient of the separation between the substrate plated d and the pitch of the liquid crystal p of $0.25 \leq d/p \leq 0.5$.

13. A TN cell according to claim 12, wherein the doping component is selected so that the temperature dependence of the threshold voltage is low.

14. Video equipment comprising a TN cell of claim 12.

15. A TN cell according to claim 14, wherein $0.30 \leq d/p \leq 0.49$.

16. A TN cell according to claim 14, wherein $0.30 \leq d/p \leq 0.40$.

17. A television set comprising a TN cell of claim 12.

18. A TN cell according to claim 17, wherein $0.30 \leq d/p \leq 0.49$.

19. A TN cell according to claim 17, wherein $0.30 \leq d/p \leq 0.40$.

20. A computer screen comprising a TN cell of claim 12.

21. A TN cell according to claim 20, wherein $0.30 \leq d/p \leq 0.49$.

22. A TN cell according to claim 20, wherein $0.30 \leq d/p \leq 0.40$.

23. A traffic guidance system comprising a TN cell of claim 12.

24. A TN cell according to claim 23, wherein $0.30 \leq d/p \leq 0.49$.

25. A TN cell according to claim 23, wherein $0.30 \leq d/p \leq 0.40$.

26. An optical computer comprising a TN cell of claim 12.

27. A TN cell according to claim 26, wherein $0.30 \leq d/p \leq 0.49$.

28. A TN cell according to claim 26, wherein $0.30 \leq d/p \leq 0.40$.

29. Optical equipment comprising a TN cell of claim 12.

30. A TN cell according to claim 29, wherein $0.30 \leq d/p \leq 0.49$.

31. A TN cell according to claim 29, wherein $0.30 \leq d/p \leq 0.40$.

32. Electronic equipment containing optical components comprising a TN cell of claim 12.

33. A TN cell according to claim 32, wherein $0.30 \leq d/p \leq 0.49$.

34. A TN cell according to claim 32, wherein $0.30 \leq d/p \leq 0.40$.

35. A method which comprises displaying information on a TN cell of claim 12.

36. A TN cell according to claim 12 which displays gray shades, whereby the gray shade capacity of the cell is improved by addition of the doping component.

37. A TN cell according to claim 12, wherein $0.30 \leq d/p \leq 0.49$.

38. A TN cell according to claim 12, wherein $0.35 \leq d/p \leq 0.49$.

39. A TN cell according to claim 12, wherein $0.40 \leq d/p \leq 0.49$.

40. A TN cell according to claim 12, wherein $0.30 \leq d/p \leq 0.40$.

41. A TN cell according to claim 12, wherein $0.35 \leq d/p \leq 0.40$.

* * * * *

UNITED STATES PATENT AND TRADEMARK OFFICE
CERTIFICATE OF CORRECTION

PATENT NO.   : 6,166,798
DATED        : December 26, 2000
INVENTOR(S)  : Plach et al.

Page 1 of 1

It is certified that error appears in the above-identified patent and that said Letters Patent is hereby corrected as shown below:

Column 12,
Line 18, change "an" to -- $\Delta$n --.
Line 45, change "an" to -- $\Delta$n --.

Signed and Sealed this

Twenty-ninth Day of July, 2003

JAMES E. ROGAN
*Director of the United States Patent and Trademark Office*